United States Patent [19]

Numata et al.

[11] 4,070,682
[45] Jan. 24, 1978

[54] EXPOSURE TIME CONTROL CIRCUIT

[75] Inventors: Saburo Numata; Shinichiro Fujino, both of Urawa, Japan

[73] Assignee: Fuji Photo Optical Co., Ltd., Omiya, Japan

[21] Appl. No.: 701,076

[22] Filed: June 30, 1976

[30] Foreign Application Priority Data

June 30, 1975 Japan .................................. 50-80674

[51] Int. Cl.$^2$ .............................................. G03B 7/02
[52] U.S. Cl. ...................................................... 354/51
[58] Field of Search ...................................... 354/50, 51

[56] References Cited

U.S. PATENT DOCUMENTS

| 3,667,357 | 6/1972 | Matsuda | 354/33 |
| 3,924,263 | 12/1975 | Alessi | 354/50 |
| 3,988,748 | 10/1976 | Iura et al. | 354/51 X |

Primary Examiner—L. T. Hix
Assistant Examiner—M. L. Gellner

[57] ABSTRACT

An exposure time control circuit for a camera includes a level selecting circuit between a light measuring circuit and a memory circuit to have a selected output memorized in the memory circuit. The level selecting circuit is provided with two inputs, one of which is the output of the light measuring circuit indicative of the scene brightness and the other of which is the output of a maximum exposure time output source indicative of the maximum exposure time acceptable to the camera. The memory circuit memorizes the output selected by the level selecting circuit which output indicates a shorter exposure time between the two.

4 Claims, 1 Drawing Figure

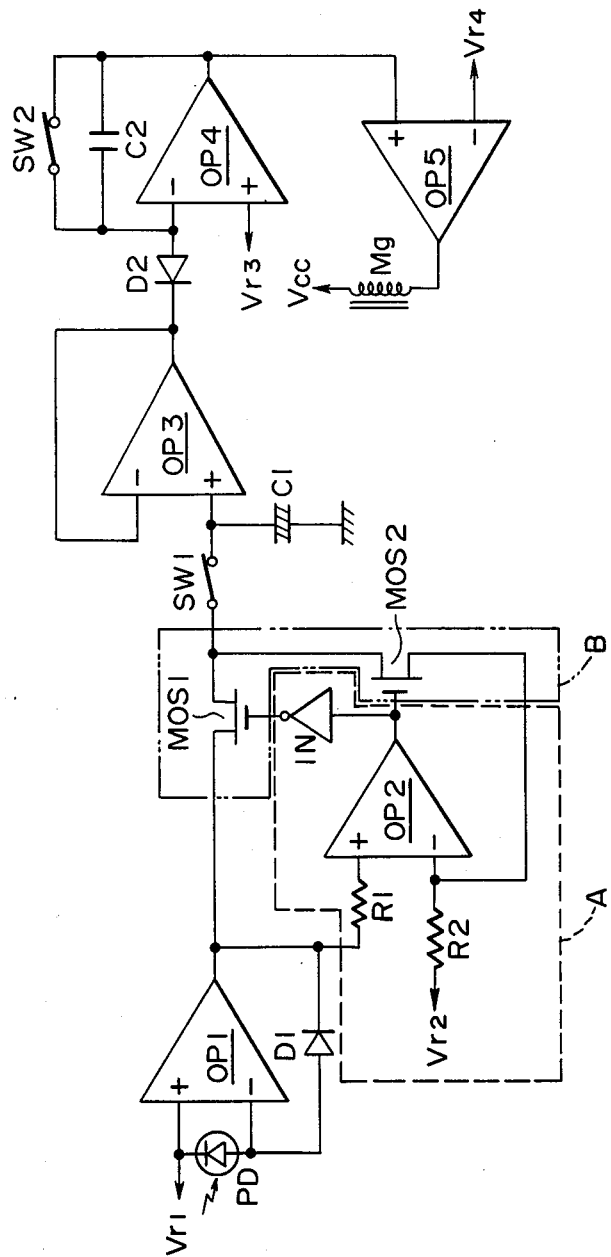

EXPOSURE TIME CONTROL CIRCUIT

BACKGROUND OF THE INVENTION

1. Field of the Invention

This invention relates to an exposure control circuit for a camera, and more particularly to a circuit for controlling an exposure time in a camera in accordance with the information memorized by a memory means which is connected with a maximum exposure time output means and a light measuring circuit. The memory means memorizes the output of either the maximum exposure time output means of the light measuring circuit.

2. Description of the Prior Art

In the automatic exposure control cameras, there have been various measures for controlling the exposure time under low scene brightness. Therefore it is now possible to take pictures of low brightness with a long exposure time. However, it is often undesirable to take pictures with a long exposure time, since the long exposure time control markedly consumes the electric power of the camera. Further, it is impossible to take pictures of high quality with such a long exposure time unless the camera is supported on a tripod.

Therefore, it has been known in the art to limit the exposure time in view of the practical photographing conditions. Thus, it is known to connect a high resistance in parallel with a photodetector to measure the scene brightness so that the exposure time control circuit may be changed over from a light measuring circuit to the high resistance to effect a predetermined maximum exposure time when the scene brightness is below a predetermined level.

This type of the exposure time limiting circuit is disadvantageous in that the photodetector having high accuracy is not made use of effectively. In other words, in this circuit, the photodetector is not used at all when the camera is operated to take pictures with the maximum exposure time.

SUMMARY OF THE INVENTION

In view of the above mentioned disadvantages of the prior art, the primary object of the present invention is to provide an exposure time control circuit for a camera which makes use of the photodetector even when the scene brightness is low.

Another object of the present invention is to provide an exposure time control circuit for a camera which controls the exposure time with high accuracy even when the exposure time controlled is almost equal to the maximum exposure time.

The exposure time control circuit in accordance with the present invention is characterized in that a memory circuit in accordance with the output of which the exposure time is controlled is connected with a maximum exposure time output means and a light measuring circuit, and that the memory circuit selects one of the outputs from the former and the latter that is shorter than the other. When the output exposure time give by the maximum exposure time output means is shorter than the output exposure time given by the light measuring circuit, the maximum exposure time is selected to be memorized by the memory means and the exposure time is controlled in accordance therewith.

BRIEF DESCRIPTION OF THE DRAWING

A single FIGURE shows an embodiment of the exposure time control circuit in accordance with the present invention.

DESCRIPTION OF THE PREFERRED EMBODIMENT

Referring to the drawing which shows an exposure time control circuit for use in a single lens reflex camera, a photodiode PD is connected between the positive input terminal and the negative input terminal of a first operational amplifier OP1. The positive input terminal thereof is connected with a reference voltage source Vr1 indicative of the manually controlled diaphragm information and the film sensitivity. A log conversion diode D1 is connected between the negative input terminal and the output of the first operational amplifier OP1. Thus, a light measuring circuit is constituted.

A third operational amplifier OP3 (A second operational amplifier OP2 will be described hereinafter.) has its negative input terminal connected with the output terminal thereof and a memorizing capacitor C1 is connected with the positive input terminal thereof. The memorizing capacitor C1 is grounded. Thus, a memory circuit is constituted.

A fourth operational amplifier OP4 is connected at its negative input terminal with the output terminal of said third operational amplifier OP3 by way of a time expansion diode D2, the anode of which is connected with the negative input and the cathode of which is connected with the output of the third operational amplifier OP3. An integrating capacitor C2 is connected between the negative input terminal and the output terminal thereof. A start switch SW2 which is opened in response to start of the leading shutter blind of the camera is connected in parallel with the integrating capacitor C2. Thus, a time expansion circuit is constituted.

A fifth operational amplifier OP5 is connected at its positive input terminal with the output terminal of said fourth operational amplifier OP4. The negative input terminal thereof is connected with a reference voltage source Vr4 and the output terminal thereof is connected with a trailing shutter blind holding magnet Mg. The fifth operational amplifier OP5 serves as a comparator which compares the output from the fourth amplifier OP4 with the reference voltage Vr4 and operates to deenergize the magnet Mg when the level of the output from the fourth operational amplifier OP4 has reached the level of the reference voltage Vr4.

The above described circuit elements OP1, OP3, OP4 and OP5 are well known in the art wherein the positive input terminal of the third operational amplifier OP3 is connected with the output terminal of the first operational amplifier OP1. Accordingly, the detailed description thereof is omitted here.

The exposure time control circuit in accordance with the present invention is characterized in that a second operational amplifier OP2 and switching elements MOS1 and MOS2 are connected between the light measuring circuit including the first operational amplifier OP1 and the memory circuit including the third operational amplifier OP3. The second operational amplifier OP2 is connected at its negative input terminal with a reference voltage Vr2 determined in accordance with the maximum exposure time by way of a resistor R2 and at its positive input terminal with the output of said first operational amplifier OP1 by way of a resistor R1. Further, the negative input terminal of the second operational amplifier OP2 is connected with the positive input terminal of the third operational amplifier OP3 by way of a MOS-FET (Metal Oxide Semiconductor type Field Effect Transistor) MOS2 the gate of which is connected with the output terminal of the second operational amplifier OP2 and a mirror-up switch SW1 which is opened in response to the swing-up of a mirror in the single lens reflex camera. The output terminal of the second operational amplifier OP2 is further connected with the positive input terminal of the third operational amplifier OP3 by way of an inverter IN, another MOS-FET MOS1 the gate of which is connected with the inverter IN, and said mirror-up switch SW1. Further, the output of said first operational amplifier OP1 is connected with the positive input terminal of the third operational amplifier OP3 by way of the MOS-FET MOS1 and the switch SW1. Thus, a selecting circuit A and a switching circuit B are constituted.

In operation of the above described exposure time control circuit, the scene brightness is measured by the photodetector PD. The first operational amplifier OP1 operates to give an output indicative of the desirable exposure time in accordance with the input from the photodetector PD and the reference voltage $Vr1$ determined by the diaphragm information and the film sensitivity. When the output exposure time from the first operational amplifier OP1 is shorter than (i.e. the level of the output is lower than) the maximum exposure time (i.e. the reference voltage $Vr2$), the output voltage of the second operational amplifier OP2 becomes low and accordingly said MOS1 is turned on and said MOS2 is turned off so that the output of the first operational amplifier OP1 is memorized in said memorizing capacitor C1. To the contrary, when the output of the first operational amplifier OP1 is higher than the reference voltage $Vr2$, the output voltage of the second operational amplifier OP2 becomes high, and accordingly, the MOS1 is turned off and the MOS2 is turned on so that the reference voltage $Vr2$ is memorized in said memorizing capacitor C1.

Then, upon depression of a shutter release button (not shown) which results in swing up of a mirror and start of the leading shutter blind, said mirror-up switch SW1 and said start switch SW2 are opened and said integrating capacitor C2 starts to be charged in accordance with the information memorized in said memorizing capacitor C1 which memorizes either the output of the first operational amplifier OP1 or the reference voltage $Vr2$. The output of the operational amplifier OP1 indicates the exposure time corresponding to the scene brightness and the reference voltage indicates the maximum exposure time. The output of the integrating capacitor C2 is compared with the reference voltage $Vr4$ at the fifth operational amplifier OP5 and the trailing shutter blind holding magnet Mg is deenergized when the time determined by the information charged in the integrating capacitor C2 has lapsed. Thus, the exposure time is controlled in accordance with the output of the light measuring circuit when the time controlled is not longer than the predetermined maximum exposure time.

We claim:

1. An exposure control circuit for a camera comprising a light measuring and exposure time determining circuit including a photodetector to measure the scene brightness, a memory circuit connected therewith for memorizing the output therefrom, and an exposure time control circuit connected with said memory circuit for controlling exposure time in accordance with the output memorized by said memory circuit, wherein the improvement comprising a maximum exposure time output means, and an exposure time selecting means connected with said maximum exposure time output means and said light measuring and exposure time determining circuit for selecting the output indicative of a shorter exposure time between the output of said light measuring and exposure time determining circuit and the output of said maximum exposure time output means, said exposure time selecting means being connected with said memory circuit for giving the selected output to the memory circuit, said exposure time selecting means comprising a level comparing circuit and a switching means, said level comparing circuit comparing the output of said light measuring and exposure time determining circuit with the output of said maximum exposure time output means, and said switching means selectively connecting one of said outputs with said memory circuit, said level comparing circuit being an operational amplifier having a positive input terminal and a negative input terminal, said positive input terminal being connected with the output of said light measuring and exposure time determining circuit, said negative input terminal being connected with said maximum exposure time output means, whereby said exposure time control circuit controls the exposure time in accordance with the output selected by said selecting means indicative of the shorter exposure time between said maximum exposure time and the exposure time output from said light measuring circuit and exposure time determining circuit.

2. An exposure time control circuit for a camera as defined in claim 1 wherein said operational amplifier is connected at its output terminal with said memory circuit by way of said switching means.

3. An exposure time control circuit for a cameras as defined in claim 1 wherein said switching means comprises two switches, one of which is opened when said output of the light measuring and exposure time determining circuit is higher than said output of the maximum exposure time output means, the other of which is opened when the former output is lower than the latter output.

4. An exposure time control circuit for a camera as defined in claim 3 wherein said two switches are MOS FETs.

* * * * *